June 15, 1965     J. H. LUX     3,189,243

CONTAINERS MADE FROM PLASTIC FOAM SHEET

Filed May 21, 1963

INVENTOR.
JOHN H. LUX
BY
Cushman, Darby & Cushman
ATTORNEYS

United States Patent Office 3,189,243
Patented June 15, 1965

---

3,189,243
CONTAINERS MADE FROM PLASTIC FOAM SHEET
John H. Lux, Charlestown, Md., assignor, by mesne assignments, to Haveg Industries, Inc., a wholly owned subsidiary of Hercules Powder Company, Newcastle, Del., a corporation of Delaware
Filed May 21, 1963, Ser. No. 282,051
4 Claims. (Cl. 229—3.5)

This invention relates to foamed plastics and more especially to containers made from such foamed plastics.

It has been proposed in the past to make collapsible cartons by folding a carton blank made of a sandwich having two spaced-apart sheets of paper having the space therebetween filled with a layer of foamed compressible plastic, Lane Patent 2,770,406. This procedure has the disadvantage that the carton imparts to articles packed therein a "cardboard" taste and odor.

It has also been proposed in the past to prepare cartons from foamed plastic sheets. Such sheets do not have the tensile strength characteristics on the convex surface of a fold or crease to maintain structural integrity.

It is an object of the present invention to prepare novel foamed plastic sheets.

Another object is to prepared foamed plastic cartons having increased tensile strength on the convex surface of folds and creases.

A further object is to prepare a foamed plastic container which can be formed using conventional cardboard folding methods and equipment.

An additional object is to prepare a low cost, moisture resisting, insulating container.

A further object is to develop a container free from cardboard taste and odor which is also resistant to mold and mildew.

Yet another object is to prepare a container combining structural rigidity with light weight.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by forming a foamed sheet consisting of (1) a moderate to high density uniform foam, thermoplastic resin core, (2) a non-porous, tough, thermoplastic resin outer skin, and (3) a non-porous, tough, thermoplastic resin inner skin, said core comprising 50 to 90% of the total thickness of the skins and core, said core being integrally united to said skins. It is critical that one of said skins be between 2 and 5 times the thickness of the other skin.

It is also desirable that the foam have a density between 5 and 45 lbs./cu. ft., preferably between 12 and 35 lbs./cu. ft. The skins are essentially unexpanded and have a considerably higher density than the foamed core, e.g., they can have a density of 60 to 66 lbs./cu. ft.

Various polymers can be used to form the foamed plastic.

When employing polystyrene there can be employed normal crystal grade polystyrene or high impact polystyrene or a mixture container 5 to 95% normal crystal grade polystyrene and the balance high impact polystyrene. When employing a thermoplastic styrene polymer it normally contains greater than 50% by weight of styrene and preferably at least 70% by weight of styrene in its structure. High impact polystyrenes are frequently prepared by polymerizing monomeric styrene in the presence of 2½ to 10% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 95.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 5% polystyrene and 5% polyisoprene, and a copolymer of 99.5% styrene and 0.5% divinyl benzene.

Unless otherwise indicated, all parts and percentages are by weight.

The foamable thermoplastic resins which can be extruded according to the invention include cellulose ethers and esters, e.g., ethyl cellulose, cellulose acetate, cellulose acetate-butyrate, homopolymers and interpolymers of monomeric compounds containing the $CH_2{=}C{<}$ grouping, such as olefins, e.g., ethylene, propylene, isobutylene, vinyl halides, e.g., vinyl chloride; vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above-mentioned vinylidene monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials with which optimum results are obtained are rigid, relatively non-elastic, thermoplastic resins such as homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Other suitable thermoplastic resins include polycarbonates, e.g., the polymer from bisphenol A and diphenyl carbonate; polyurethanes, e.g., from toluene diisocyanate and polypropylene glycol molecular weight 2025; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer).

The invention is of particular value in making foamed cartons and boxes from polyethylene (of high density, e.g., 0.960, medium density, e.g., 0.935 or low density, e.g., 0.914), polypropylene, copolymers of ethylene and propylene (e.g., 50–50 copolymer) and high impact polystyrene.

To insure the formation of a uniform foamed plastic core a nucleating agent should be used in forming the foamed sheet.

When a nucleating agent is employed, it is used in an amount of from 0.02 to 10% of the total polystyrene by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g. Triton X100 (t-octylphenol-ethylene oxide adduct having 10 ethylene oxide units in the molecule), sodium lauryl sulfate and sodium dodecylbenzene sulfonate. The wetting agent can be nonionic or anionic.

The preferred mode of incorporating the foaming agent into the polymer is by premixing the pelletized, solid, thermoplastic polymer, e.g., high impact styrene polymer, with a minor amount of an absorbent having absorbed thereon a volatile liquid (i.e., the foaming agent) which is non-reactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 to 15% preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polymer, e.g., polystyrene, to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent absorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of an extruder.

The foamed sheet is formed by extruding a hot sheet of foamable thermoplastic resin composition, rapidly chilling the outer and inner surfaces only of the sheet to prevent expansion thereof and to form outer and inner skins while permitting the still warm core of the sheet to expand. The chilling can be done with an air blast, an air-water mist, argon, helium or other inert fluid. The chilling is carried out in such fashion that one skin is at least twice as thick as the other skin. This can be accomplished by various ways. One method is by differential cooling, e.g., by cooling one surface to a lower temperature than the other surface while using the same rate of air flow, e.g., cooling the upper surface with air at 70° F. while cooling the lower surface with air at 0° F., both air flow rates being at 60 ft./min. In such case, the surface receiving the colder air blast will have the thicker skin. By using a very cold stream of chilling fluid a skin of highest density is produced. This is important where a completely impervious skin film is wanted, e.g., for the inside surface of a container for liquids.

On the other hand, for a thick skin which need not be absolutely impervious, a chilling blast of somewhat warmer air can be used for a longer distance along the sheet. This provides a more moderate cooling, but to a greater depth. This is desirable when a heavier skin is needed for structural strength. Thus, the air blast on the top surface could be for 3 times the linear distance of the air blast on the lower surface, both air blasts being at 80 ft./sec. at 70° F. The top and bottom cooling fluid also can be used at different rates, e.g., a bottom rate of 50 ft./sec. and a top rate of 80 ft./sec. while using the same or different cooling temperatures.

The foamed sheets having the skins of different thicknesses can have a total thickness as little as 10 mils (for the preparation of small or delicate packages) or as much as 120 mils, or even up to 300 mils. Usually, the thicker sheets, e.g., 50 mils and above, will have the lower overall densities.

A tough skin is produced on one side of the sheet, i.e., the side to be subjected to convex folding upon further fabrication. The other side of the sheet is made with the thinner surface skin. The foamed sheet so formed is fed directly to cutting and folding machinery, e.g., that used in forming ice cream containers, candy boxes, six packs, etc. Containers from the flat foamed sheet having differential surface skins can be formed into containers, e.g., boxes utilizing conventional cardboard folding methods and equipment.

There is thus provided at lowre cost a moisture resisting, insulating, clean container. The containers are free from a cardboard taste or odor and are resistant to corosive agents, vermin, fungus, mold and mildew. They combine structural rigidity with light weight. Their thermal insulating characteristics are especially advantageous for packaging frozen foods, ice cream or for maintaining foods hot, e.g., carry-out chicken dinners or chow mein. They are also useful in making candy boxes.

The tough skin produced provides the requisite tensile strength characteristics on the convex surface of folds or creases to maintain structural integrity and makes it possible to fold the foamed plastic material.

When it is desired to seal the container this can be accomplished by conventional plastic sealing techniques, e.g., heat sealing or sealing with adhesives such as polyvinyl acetate adhesives.

Figure 1:
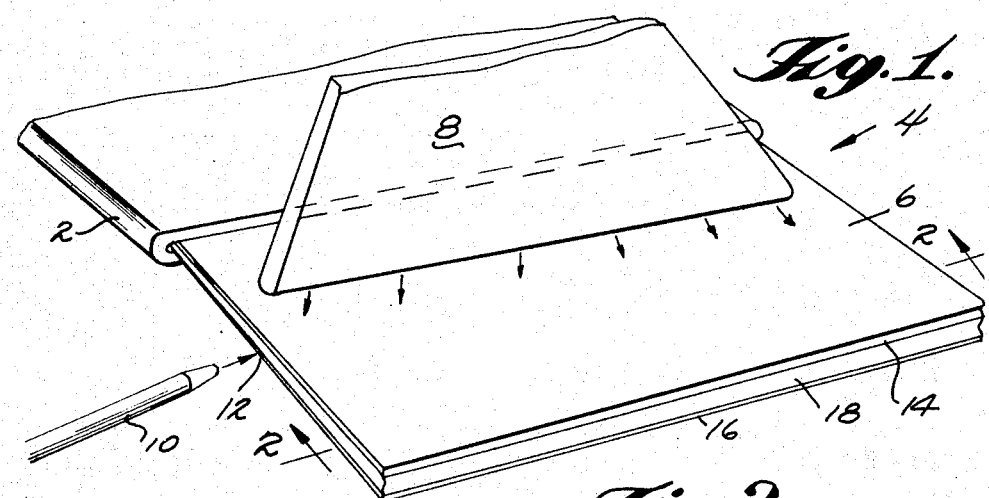
FIGURE 1 is a perspective view showing the formation of a foamed sheet according to the invention.

Referring more specifically to FIGURE 1 of the drawings there is provided a high impact polystyrene, specifically polystyrene modified with 5% polybutdaiene (Foster Grant's Tuflex 216). 100 parts of the high impact polystyrene was mixed with 2 parts of Celite having pentane absorbed thereon. (There was 1 part of pentane and 1 part of Celite to make up the total of 2 parts.) There was also mixed with the high impact polystyrene 0.5 part of Bayol 35, 0.3 part of powdered anhydrous citric acid and 0.4 part of powdered sodium bicarbonate.

This mixture is then extruded at conventional temperatures for extruding the polymer, e.g., temperatures between 270° and 340° F. for polystyrene.

In the specific example with the mixture just set forth it was extruded from extruder 2 in the form of a sheet 4 at a tempreature of 300° F. and 2500 p.s.i. Substantially immediately thereafter the upper surface 6 of the sheet 4 was blasted with air at 0° F. from nozzle 8 at a rate of 80 ft./sec. while simultaneously the lower surface 12 of the sheet was blasted with air at 70° F. from nozzle 10 at a rate of 50 ft./sec. (Each air blast is designed so as to uniformly cover the surface, upper or lower, as the case might be, and the nozzles 8 and 10 are merely representations of the actual overall air blast.)

The sheet, as it emerges from the extruder and prior to any expansion, had an overall thickness of about 30 mils. After being subjected to the upper and lower air blasts and foaming to maximum thickness there was produced a sheet having a total thickness of 60 mils. There was produced an upper skin layer 14 having a thickness of 16 mils, a lower skin layer 16 of 8 mils and a foamed core 18 of 36 mils. The foamed core was integrally united to the substantially impervious, non-porous skins. The sheet had an overall density of approximately 30 lbs./cu. ft., although the skin portions had densities of slightly above 60 lbs./cu. ft.

Figure 2:
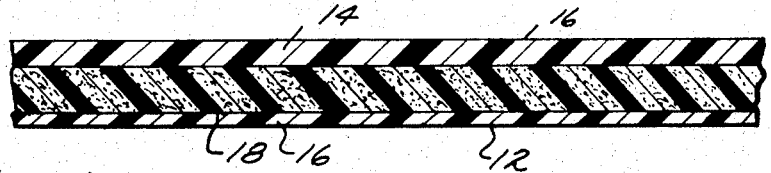
FIGURE 2 is a sectional view along the line 2—2 of FIGURE 1.
Figure 3:
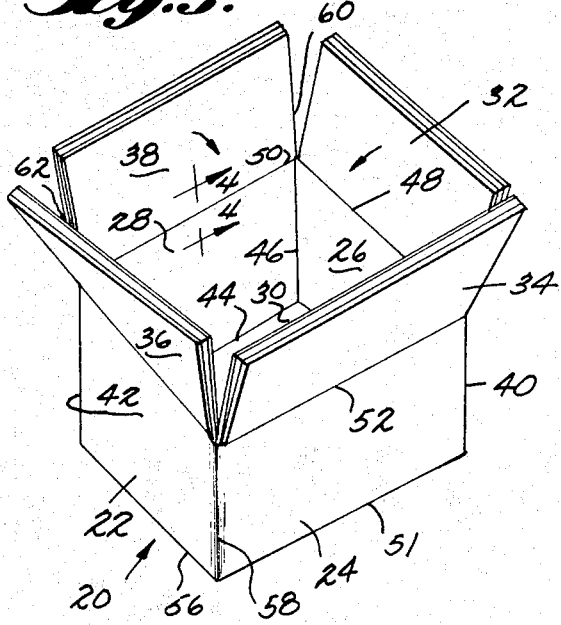
FIGURE 3 is a perspective view showing a typical carton embodying the invention.
Figure 4:
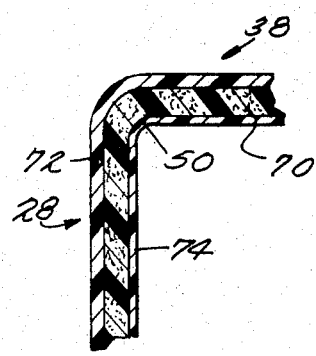
FIGURE 4 is a partial sectional view along the line 4—4 of FIGURE 3 with top flap turned inward.

FIGURES 3 and 4 show a carton 20 made according to the invention. The carton can be formed on conventional machinery used for forming corrugated paperboard boxes, such as that described in the Lane Patent 2,770,406, for example. The carton is made of one integral sheet or blank of foamed, high impact polystyrene of the type described in connection with FIGURES 1 and 2. The foamed polystyrene sheet had a thickness of 60 mils, including a 36 mil foamed core and a skin on one side of 8 mils and on the other side a skin of 16 mils.

The carton was formed with side walls 22, 24, 26 and 28, bottom wall 30 and a top wall. The top wall was composed of flaps 32, 34, 36 and 38. The bottom wall 30 was composed of similar flaps (not shown). Scoring of the carton blank was accomplished to give score lines such as 40, 42, 44, 46, 48, 50, 52, 51 and 56 along the appropriate places in the blank to provide the various edges of the carton. After the carton blank had been folded, the meeting of walls 22 and 24 was secured together by heat sealing. Alternatively, an adhesive, such as polyvinyl acetate, can be used. To increase the strength of the joinder of walls 22 and 24 there can also be employed a fabric overlying both walls a slight extent at the joint 58.

The flaps 32, 34, 36 and 38 are separated, as shown, at 60 and 62, for example. Such separation is accomplished in conventional fashion by forming suitable slits in the blank prior to forming the carton.

FIGURE 4 shows, in somewhat idealized form, the construction of the foamed carton and the manner in which it is possible to form a crease or fold and maintain structural integrity. The walls of the carton, such as wall 28 and flap 38, are made of a sandwich of the foamed, high impact polystyrene core 70 integrally united to an impervious, thick, outer skin 72 of unfoamed, high impact polystyrene and a thin inner skin 74 of the high impact polystyrene. The thick skin 72 provides sufficient tensile strength on the convex surface of the folds, such as fold 50, to maintain structural integrity.

The carton described above is of the collapsible type. The foamed polystyrene sandwich is sufficiently flexible to permit free bending for the formation of at least 90° corners without rupture of the foamed core or the skins adhered thereto.

Instead of forming the container from a sheet of the thermoplastic foam, it is also possible to form the container from a hollow cylinder of thermoplastic foam having internal and external skins. Such a cylinder is collapsed after formation and then scored into thirds if, for example, it is desired to produce a hexagonal container. The hexagonal end flaps of the same thermoplastic foam can be applied to the container either by adhesives or by heat sealing.

I claim:

1. A collapsible carton formed by folding a carton blank, characterized in that the blank consists of (1) a uniform foam, thermoplastic resin core, (2) a tough, non-porous, unfoamed resin outer skin, and (3) a tough, non-porous, unfoamed resin inner skin, said core being integral with said skins and comprising 50 to 90% of the total thickness of the blank, the skin which forms the convex surface along the fold lines of the carton being 2 to 5 times the thickness of the skin forming the concave surface along said fold lines said skins being of the same material as the foam.

2. A collapsible carton according to claim 1 wherein said resin is high impact polystyrene.

3. A collapsible carton according to claim 1 wherein the resin selected from the group consisting of polyethylene, polypropylene, ethylenepropylene copolymers and styrene polymers.

4. A collapsible carton according to claim 3 wherein the carton forming blank has a density of 12 to 45 lbs./cu. ft.

References Cited by the Examiner

UNITED STATES PATENTS

| 2,552,641 | 5/51 | Morrison | 220—9 |
| 2,905,350 | 9/59 | Edwards | 229—1.5 |

FOREIGN PATENTS

| 93,741 | 4/59 | Norway. |

THERON E. CONDON, *Primary Examiner.*